(12) United States Patent
Emoff et al.

(10) Patent No.: US 8,608,062 B2
(45) Date of Patent: Dec. 17, 2013

(54) RECOGNITION AND REWARD SYSTEM AND METHOD

(75) Inventors: Michael J. Emoff, Dayton, OH (US); Danuta B. Boshinski, Clayton, OH (US); Gary Lee Moore, Jr., Dayton, OH (US)

(73) Assignee: Boost Technologies, LLC, Dayton, OH (US)

( * ) Notice: Subject to any disclaimer, the term of this patent is extended or adjusted under 35 U.S.C. 154(b) by 298 days.

(21) Appl. No.: 13/071,946

(22) Filed: Mar. 25, 2011

(65) Prior Publication Data

US 2011/0284631 A1    Nov. 24, 2011

Related U.S. Application Data

(60) Provisional application No. 61/395,995, filed on May 20, 2010, provisional application No. 61/399,556, filed on Jul. 14, 2010, provisional application No. 61/400,607, filed on Jul. 30, 2010, provisional application No. 61/458,449, filed on Nov. 23, 2010.

(51) Int. Cl.
*G06F 17/00* (2006.01)
*G06K 5/00* (2006.01)
*G06K 7/00* (2006.01)
*G06Q 10/00* (2012.01)
*G06Q 30/00* (2012.01)

(52) U.S. Cl.
USPC ........... 235/380; 235/375; 235/435; 235/492; 705/7.42; 705/14.1

(58) Field of Classification Search
USPC ......... 235/375, 380, 435, 492, 462.01–46.49; 705/7.42, 14.1
See application file for complete search history.

(56) References Cited

U.S. PATENT DOCUMENTS

| | | | |
|---|---|---|---|
| 7,639,136 B1 * | 12/2009 | Wass et al. | 340/572.1 |
| 2004/0149736 A1 * | 8/2004 | Clothier | 219/627 |
| 2005/0206078 A1 | 9/2005 | Soltys | |
| 2005/0242177 A1 * | 11/2005 | Roberge et al. | 235/383 |
| 2006/0044137 A1 | 3/2006 | Morris et al. | |
| 2006/0127866 A1 * | 6/2006 | Damron et al. | 434/236 |
| 2007/0294145 A1 | 12/2007 | Hall | |
| 2007/0296552 A1 | 12/2007 | Huang et al. | |
| 2008/0040130 A1 | 2/2008 | Lederman et al. | |
| 2008/0061979 A1 * | 3/2008 | Hause et al. | 340/572.1 |
| 2008/0208753 A1 * | 8/2008 | Lee et al. | 705/51 |
| 2009/0002133 A1 * | 1/2009 | Braunstein | 340/10.42 |
| 2009/0276296 A1 * | 11/2009 | Spriegel | 705/11 |
| 2009/0289936 A1 * | 11/2009 | Sheedy et al. | 345/214 |
| 2010/0030633 A1 | 2/2010 | Beenau et al. | |

OTHER PUBLICATIONS

Daily RFID Co., Limited, "Industrial PDA HF Handheld Reader DL730" (webpage printed on Mar. 7, 2011).

* cited by examiner

*Primary Examiner* — Michael G Lee
*Assistant Examiner* — Laura Gudorf
(74) *Attorney, Agent, or Firm* — Walters & Wasylyna LLC

(57) ABSTRACT

A recognition and reward system including an identification assembly carried by a first party, the identification assembly including an identification code supported by a substrate, the identification code including data, a reader assembly carried by a second party, the reader assembly being configured to collect the data from the identification code when the identification assembly is presented to the reader assembly, and a rewards program platform selectively interfaceable with the reader assembly to receive the data collected by the reader assembly, wherein the rewards program platform awards redeemable points to the first or second party based on the collected data.

56 Claims, 12 Drawing Sheets

US 8,608,062 B2

RECOGNITION AND REWARD SYSTEM AND METHOD

PRIORITY

This application claims priority from the following United States provisional patent applications, the entire contents of which are incorporated herein by reference: U.S. Ser. No. 61/395,995 filed May 20, 2010; U.S. Ser. No. 61/399,556 filed Jul. 14, 2010; U.S. Ser. No. 61/400,607 filed Jul. 30, 2010; and U.S. Ser. No. 61/458,449 filed Nov. 23, 2010.

FIELD

This application relates, generally, to recognition and reward systems and methods and, more particularly, to recognition and reward systems and methods by which a company employee or other entity, such as a supplier, may receive rewards, the value of which may, at least in part, depend on recognition of performance reported by the company's customers or by company supervisory personnel.

BACKGROUND

Recognition and reward systems are used by supervisors or customers to reward points for beneficial behavior exhibited by employees. The reward points accumulated by employees may be "cashed in" for lifestyle awards or products, such as apparel marked with the company logo, that have been made available to the employee by the company or a rewards management company that has contracted with the company. Therefore, recognition and reward systems provide employees with an incentive to perform their duties in accordance with company directives.

Despite the existence of certain recognition and reward systems, those skilled in the art continue with research and development efforts in the field of recognition and reward systems and methods.

SUMMARY

In one aspect, disclosed is a reader assembly that includes a housing, a cord connected to the housing, an RFID receiver at least partially received in the housing and a connection interface configured to communicate data received by the RFID receiver to a data collector. The cord may be a retractable cord. The connection interface may be a USB interface, such as a USB terminal or a USB port.

In another aspect, the disclosed recognition and reward system may include (1) an identification assembly carried by a first party, the identification assembly including an identification code supported by a substrate, the identification code including data, such as data indicative of the first party and/or a reason for recognition, and (2) a reader assembly carried by a second party, the reader assembly being configured to collect the data from the identification code when the identification assembly is presented to the reader assembly.

In another aspect, the disclosed recognition and reward system may include (1) an identification assembly carried by a first party, the identification assembly including an identification code supported by a substrate, the identification code including data, (2) a reader assembly carried by a second party, the reader assembly being configured to collect the data from the identification code when the identification assembly is presented to the reader assembly, and (3) a rewards program platform selectively interfaceable with the reader assembly to receive the data collected by the reader assembly, wherein the rewards program platform awards redeemable points to the first or second party based on the collected data.

In another aspect, the disclosed recognition and reward system may include (1) an identification assembly carried by a first party, the identification assembly including a substrate and a plurality of identification codes supported by the substrate, each identification code including data indicative of the first party and a unique reason for recognition, and (2) a reader assembly carried by a second party, the reader assembly being configured to collect the data from at least one identification code when the identification code is presented to the reader assembly.

In another aspect, the disclosed recognition and reward method may include the steps of (1) providing a second party with an identification assembly including an identification code supported by a substrate, the identification code comprising data, (2) providing a first party with a reader assembly, (3) presenting the identification code to the reader assembly such that the reader assembly collects the data from the identification code, (4) transferring the data collected by the reader assembly to a rewards program platform, and (5) awarding the first party points based on the data transferred to the rewards program platform.

In yet another aspect, the disclosed recognition and reward method may include the steps of (1) providing a first party with an identification assembly including an identification code supported by a substrate, the identification code comprising data, (2) providing a second party with a reader assembly, (3) presenting the identification code to the reader assembly such that the reader assembly collects the data from the identification code, (4) transferring the data collected by the reader assembly to a rewards program platform, and (5) awarding the first party points based on the data transferred to the rewards program platform.

Other aspects of the disclosed recognition and reward system and method will become apparent from the following description, the accompanying drawings and the appended claims.

DETAILED DESCRIPTION

Figure 1:
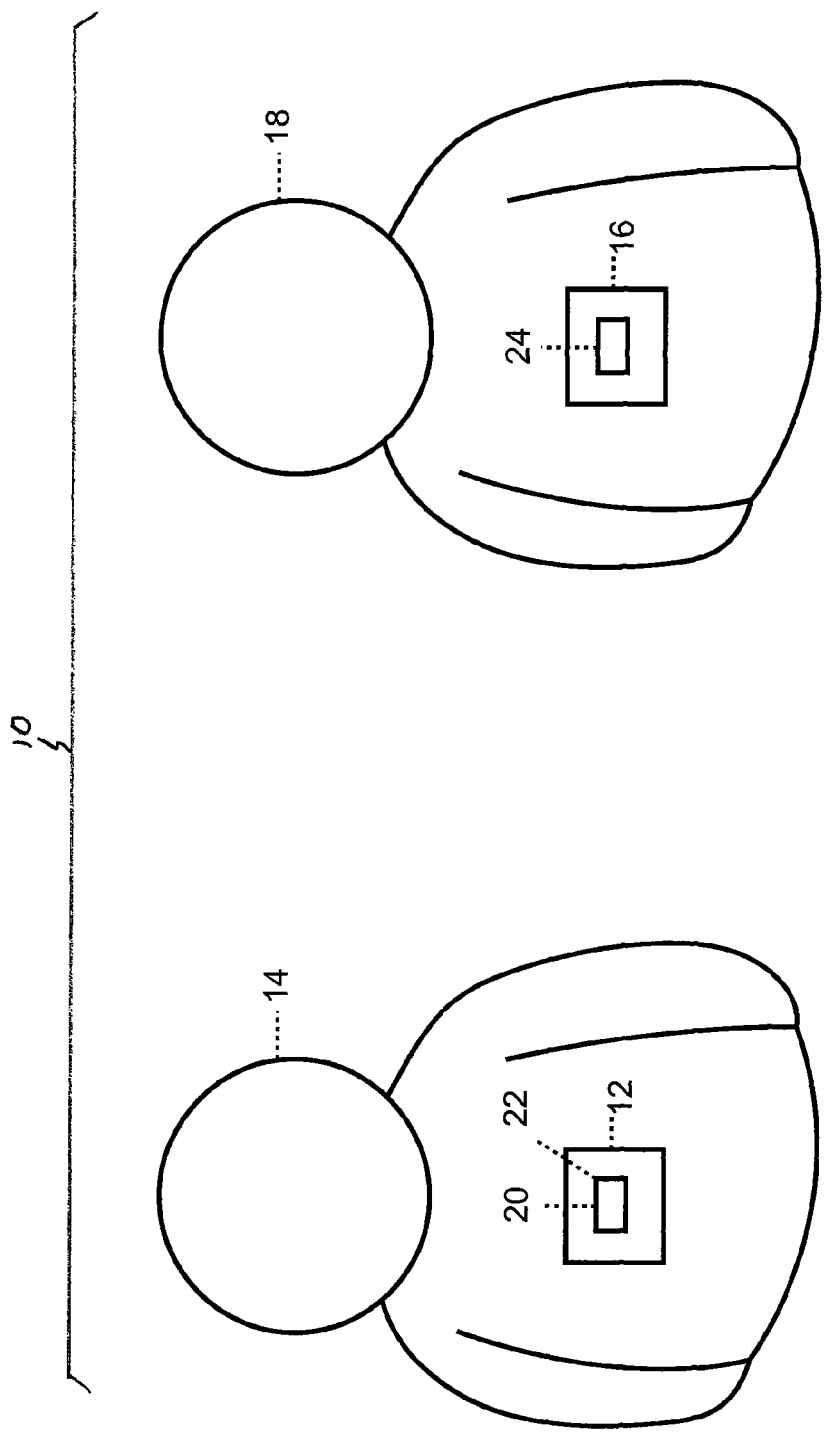
FIG. 1 is a schematic illustration of one aspect of the disclosed recognition and reward system.

Referring to FIG. 1, one aspect of the disclosed recognition and reward system, generally designated 10, may include an identification assembly 12 carried by a first party 14 and a reader assembly 16 carried by a second party 18. The identification assembly 12 may include an identification code 20 supported on a substrate 22. The identification code 20 may be unique to the first party 14. The reader assembly 16 may be configured to read the identification code 20 from the identification assembly 12 and store data from the identification code 20 in a local storage medium 24. As an alternative, the data obtained by the reader assembly 16 may be transmitted (e.g., wirelessly) to a remote storage medium (e.g., a central computer) without storing the data locally.

Thus, data communicated from the identification assembly 12 to the reader assembly 16 may memorialize a recognition of one of the parties 14, 18 (i.e., the recognized party) by the other party 14, 18 (i.e., the recognizing party). Such recognition, either alone or in combination with additional recognitions, may entitle the recognized party to a reward.

The recognition and reward system 10 may include additional identification assemblies 12 and/or additional reader assemblies 16 carried by additional parties. Due to cost considerations (i.e., the reader assemblies 16 may be more expensive than the identification assemblies 12), the reader assemblies 16 may be carried by employees and the identification assemblies 12 may be carried by customers and/or supervisors. However, systems in which the reader assemblies 16 are carried by customers and/or supervisors are also contemplated.

As a first example, a business may provide each customer and/or supervisor with an identification assembly 12 and each employee with a reader assembly 16. Therefore, each customer and/or supervisor may memorialize various acts (e.g., the rendering of good service) of employees by communicating data from the customer's identification assembly 12 to the selected employee's reader 16.

As a second example, a business may provide each customer and/or supervisor with a reader assembly 16 and each employee with an identification assembly 12. Therefore, each customer and/or supervisor may memorialize the acts of certain employees by reading the identification code 20 from the employee's identification assembly 12.

Figure 2:
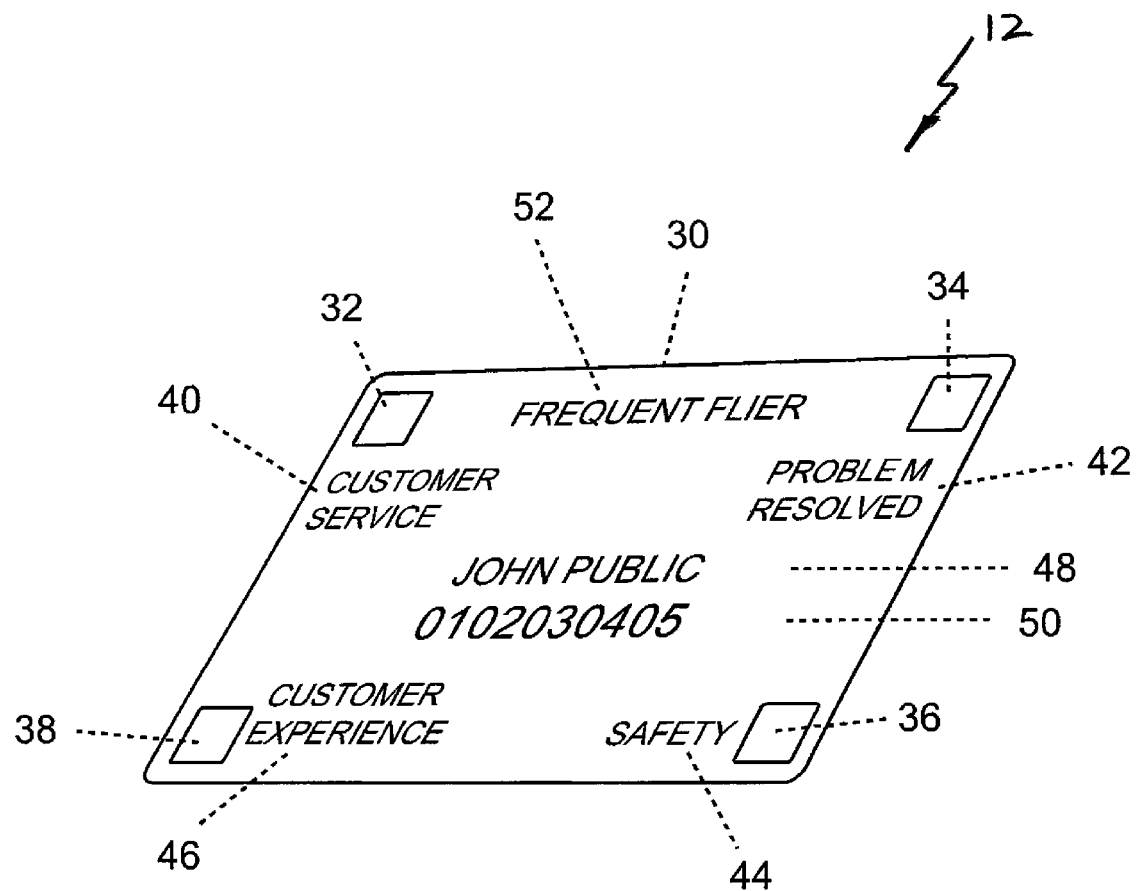
FIG. 2 is an isometric view of an identification assembly of the recognition and reward system of FIG. 1.

Referring to FIG. 2, in a first embodiment of the disclosed recognition and reward system 10, the identification assembly 12 may be a customer loyalty card, such as a customer loyalty or rewards card issued by an airline, hotel or retailer. The customer loyalty card identification assembly 12 may include a generally rectangular, plastic card substrate 30 and four identification codes 32, 34, 36, 38 affixed to, embedded into or otherwise supported on the card substrate 30, such as at the four corners of the card substrate 30. While four identification codes 32, 34, 36, 38 are shown, those skilled in the art will appreciate that fewer than four or more than four identification codes may be supported on the card substrate 30 without departing from the scope of the present disclosure.

In one particular implementation, the identification codes 32, 34, 36, 38 may be applied to the substrate 30 as decals, stickers or labels. Therefore, various items and apparatus may function as identification assemblies 12 once a decal, sticker or label carrying one or more identification code 32, 34, 36, 38 has been applied thereto.

The spacing of the identification codes 32, 34, 36, 38 on the substrate 30 may be sufficient to avoid unintentionally reading adjacent identification codes. For example, each identification code 32, 34, 36, 38 may be spaced at least 2 inches from adjacent identification codes. Those skilled in the art will appreciate that the minimum spacing of the identification codes 32, 34, 36, 38 on a substrate 30 may be dictated by the sensitivity of the reader assembly 16 or the sensitivity of the identification codes 32, 34, 36, 38, among other factors.

In an alternative embodiment, the identification assembly 12 may be comprised of multiple, separate substrates 30, with each substrate 30 carrying a unique identification code. For example, the identification assembly 12 may include four separate cards, with each card carrying one of the identification codes 32, 34, 36, 38.

The card substrate 30 may be marked with indicia 40, 42, 44, 46, such as text or graphics, proximate each identification code 32, 34, 36, 38 to identify the location of the identification code (if not readily apparent) and/or to provide various reasons why a customer may wish to recognize an employee. Examples of such reasons may include (1) customer service, (2) problem solved, (3) safety and (4) customer experience. The reasons identified on the card substrate 30 (indicia 40, 42, 44, 46) may be incorporated into the corresponding identification codes 32, 34, 36, 38.

Optionally, the card substrate 30 may be marked with additional indicia, such as, for example, the customer's name 48, an account or other customer identification number 50 (e.g., a frequent flyer number, a hotel rewards number or a credit/debit card number), the name of the loyalty program 52 and the name of the company supplying the customer loyalty card identification assembly 12.

In a first expression of the first embodiment, the identification codes 32, 34, 36, 38 supported by the card substrate 30 may be radio frequency identification ("RFID") tags and, therefore, the reader assembly 16 (FIG. 1) may include an RFID tag reader. The data encoded by each of the RFID tags 32, 34, 36, 38 may be indicative of the first party 14 (e.g., may include a tag identification number), but may also include additional information, such as additional identification numbers (e.g., a facility identification number) and/or a pre-programmed reason for recognizing an employee, as mentioned above.

Those skilled in the art will appreciate that various types of RFID tags may be used to form an RFID-functional identification assembly 12, including passive RFID tags and active RFID tags, without departing from the scope of the present disclosure. As a specific, non-limiting example, the RFID tags 32, 34, 36, 38 supported by the card substrate 30 may be passive RFID tags that operate at a frequency of 13.56 MHz.

The maximum effective range of the RFID tags may be a consideration when designing an identification assembly 12. For example, RFID tags having an effective range of at most 6 inches, perhaps at most 2 inches, may be advantageous to permit differentiation between the various RFID tags 32, 34, 36, 38 on the card substrate 30, as well as to avoid unintentional transfer of data from the RFID tags and, hence, the unwarranted recognition of a party. However, a minimum effective range of the RFID tags may also be a design consideration. For example, RFID tags having an effective range of at least 0.5 inches, perhaps at least 1 inch, may simplify and expedite use.

Figure 3:
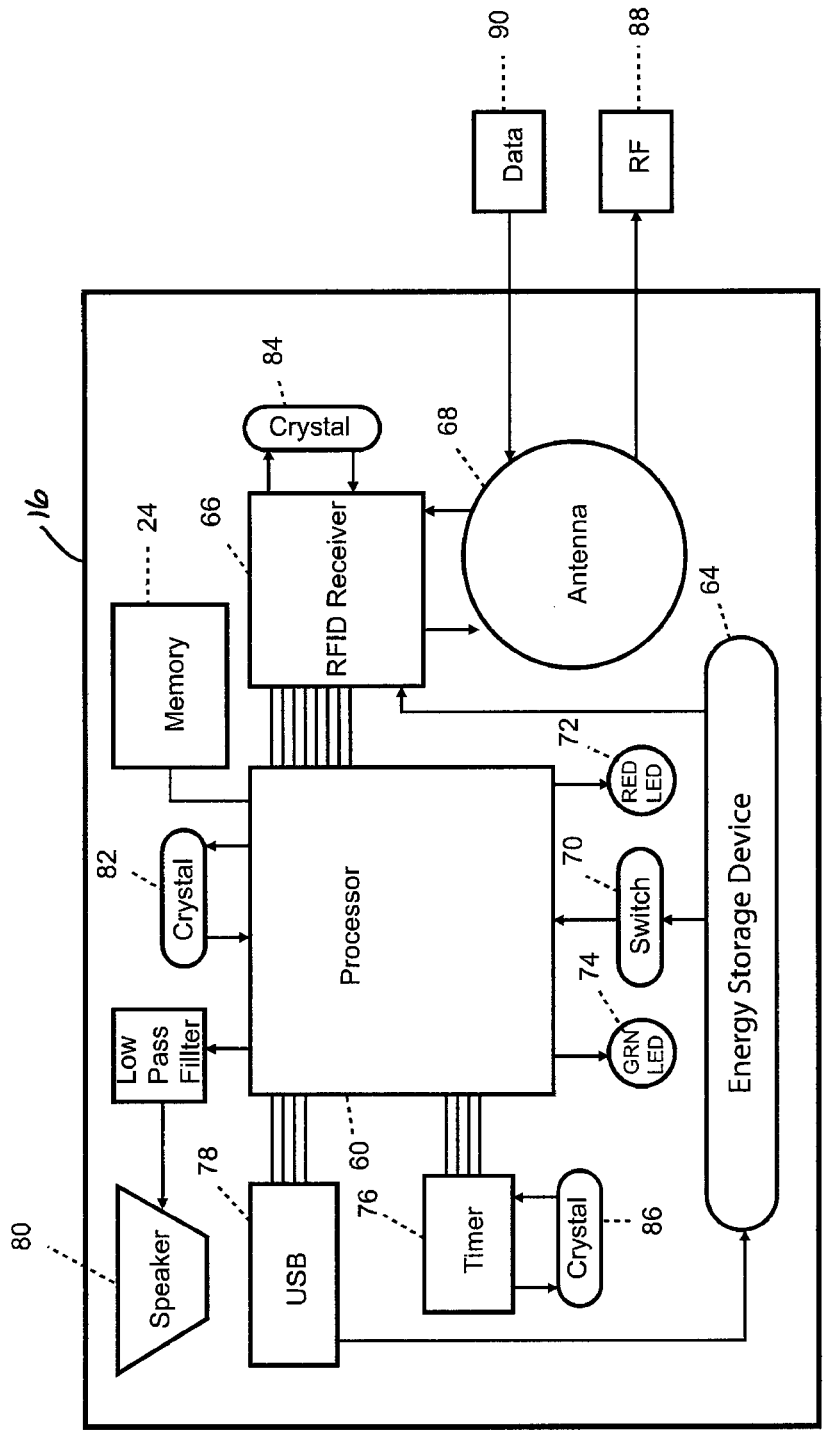
FIG. 3 is a block diagram of a reader assembly of the recognition and reward system of FIG. 1.

Referring to FIG. 3, in one realization of the first expression of the first embodiment of the disclosed recognition and reward system 10, the reader assembly 16 may include a processor 60, a storage medium 24 (e.g., flash memory), an energy storage device 64 (e.g., a super capacitor or a disposable battery), an RFID receiver 66 interfacing with an antenna 68, a switch 70, one or more light sources 72, 74 (e.g., LEDs), a timer 76, a connection interface 78 (e.g., a USB terminal) and a speaker 80. Crystal oscillators 82, 84, 86 may be coupled to the processor 60, RFID receiver 66 and timer 76, respectively, to provide the required operating frequencies.

Figure 4:
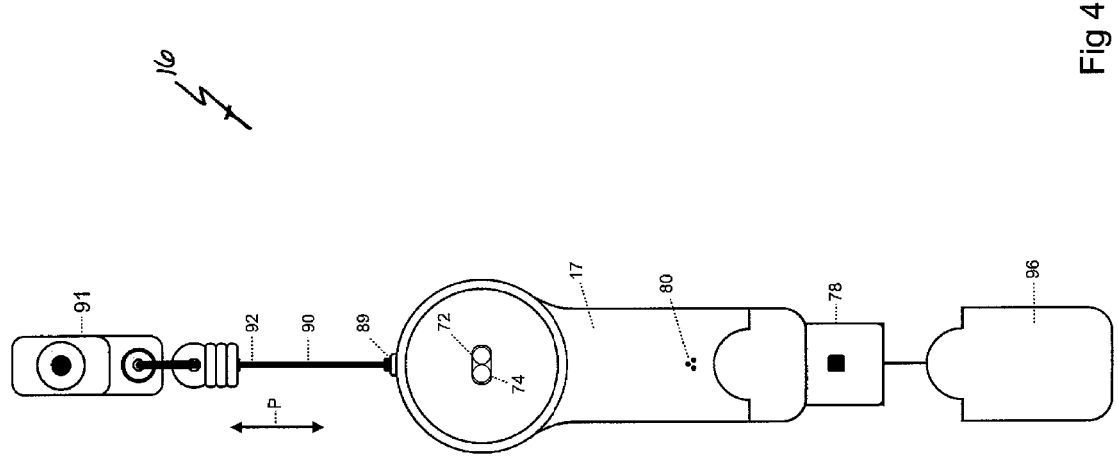
FIG. 4 is an elevational view of the reader assembly of FIG. 3, shown with the cord partially withdrawn and the terminal cap removed.

As shown in FIG. 4, a housing 17, such as a plastic housing, may enclose (at least partially) the various components of the reader assembly 16.

Referring back to FIG. 3, the reader assembly 16 may be activated by engaging the switch 70, thereby supplying electrical power to the processor 60. Light source 72 may be illuminated when the reader assembly 16 has been activated. Once activated, the processor 60 may direct the antenna 68 to emit radio frequency energy (block 88).

The reader assembly 16 may be used for an extended period of time during which the energy storage device 64 may lose the ability to produce sufficient power to operate the reader assembly 16. To extend the useful life of the energy storage device 64, or to extend the time between charging, provision may be made to turn the reader assembly 16 off when the not in use or to reduce the power level to a "sleep" level, as is well known. For example, once the switch 70 is actuated, the timer 76 may initiate a countdown such that the processor 60 may power-off the reader assembly 16 after a pre-determined amount of time (e.g., 10 or 20 seconds) has elapsed.

When one of the RFID tags 32, 34, 36, 38 (FIG. 2) on the card substrate 30 is sufficiently approximated toward the antenna 68 of the reader assembly 16 (actual contact may not be required), a data signal may be generated (block 90) and the generated data signal may be detected by the RFID receiver 66 by way of the antenna 68. Upon detecting a data signal, the processor 60 may illuminate light source 74 and/or may direct the speaker 80 to generate a human-recognizable tone, thereby signaling to the first and second parties 14, 18 that a successful data transfer has occurred.

The data signal received by the RFID receiver 66 may be encoded with a date and time stamp by way of the timer 76, and the encoded data may be stored as a file in the storage medium 24. The files stored in the storage medium 24 may be retrieved by downloading the files by way of the connection interface 78 from the reader assembly 16 into the employee's rewards account, thereby automatically banking rewarded points to the employee's account for actions performed and recognized. The rewards account may be maintained by, and the downloaded data may be processed by, the employer or a third party service provider.

As one example, the connection interface 78 of the reader assembly 16 may include a USB terminal. The reader assembly 16 may be plugged into the USB port of a computer (not shown) such that the files stored in the storage medium 24 of the reader assembly 16 may be transferred to the computer and then, optionally, deleted from the storage medium 24. Therefore, the details of who awarded the points and the reasons for the award may be electronically submitted.

As another example, the connection interface 78 may be configured for wireless data transmission (e.g., short wavelength radio transmission, such BLUETOOTH brand wireless technology). Therefore, the data collected by the reader assembly 16 may be wirelessly downloaded into the employee's rewards account.

As yet another example, the connection interface 78 may include a tethering port, such as a USB port. Therefore, a user may tether the reader assembly 16 to an electronic device, such as a computer or smartphone, using a tether cable, thereby enabling the user to download collected data from the reader assembly 16 to the electronic device. For example, a user may tether the reader assembly 16 to a smartphone using a USB tether cable, wherein one end of the tether cable (e.g., the USB end) may be plugged into the connection interface 78 of the reader assembly 16 and the other end (e.g., micro-USB, mini-USB or Apple connection) may be plugged into the smartphone. An adapter, such as a USB A female to micro-USB male adapter, may be used to facilitate interfacing the reader assembly 16 with the electronic device (e.g., smartphone).

Optionally, an application (i.e., an "app") may be loaded onto the user's electronic device (e.g., smartphone) to assist in the transfer of data from the reader assembly 16 to an electronic device and, ultimately, to the data collector (e.g., an employer or a third party service provider). However, the app may also include additional functionality. As a first example, the app may also allow the user to view the points that have accumulated in the user's rewards account. As a second example, the app may also display system generated communications to the user, such as messages regarding new rewards or the most redeemed items. As a third example, the app may also provide instructions to the user, such as instructions for earning additional reward points or instructions for redeeming reward points. As a fourth example, the app may also allow the user to enter and/or change user information, such as the user's contact information. As a fifth example, the app may also allow the user to make weblog (i.e., blog) posts.

Thus, the reader assembly 16 may be configured to read RFID tags 32, 34, 36, 38 from an identification assembly 12, encode the data with a date and time stamp, store the encoded data in a storage medium 24, and transfer the collected data to the data collector.

Figure 5:
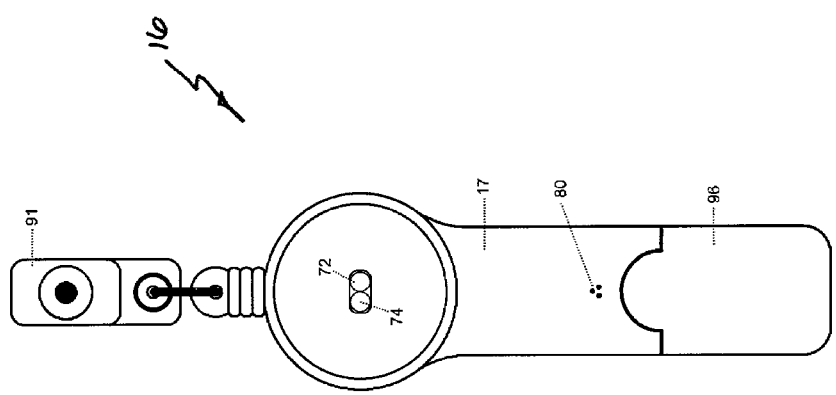
FIG. 5 is an elevational view of the reader assembly of FIG. 4, shown with the cord in a retracted configuration.
Figure 6:
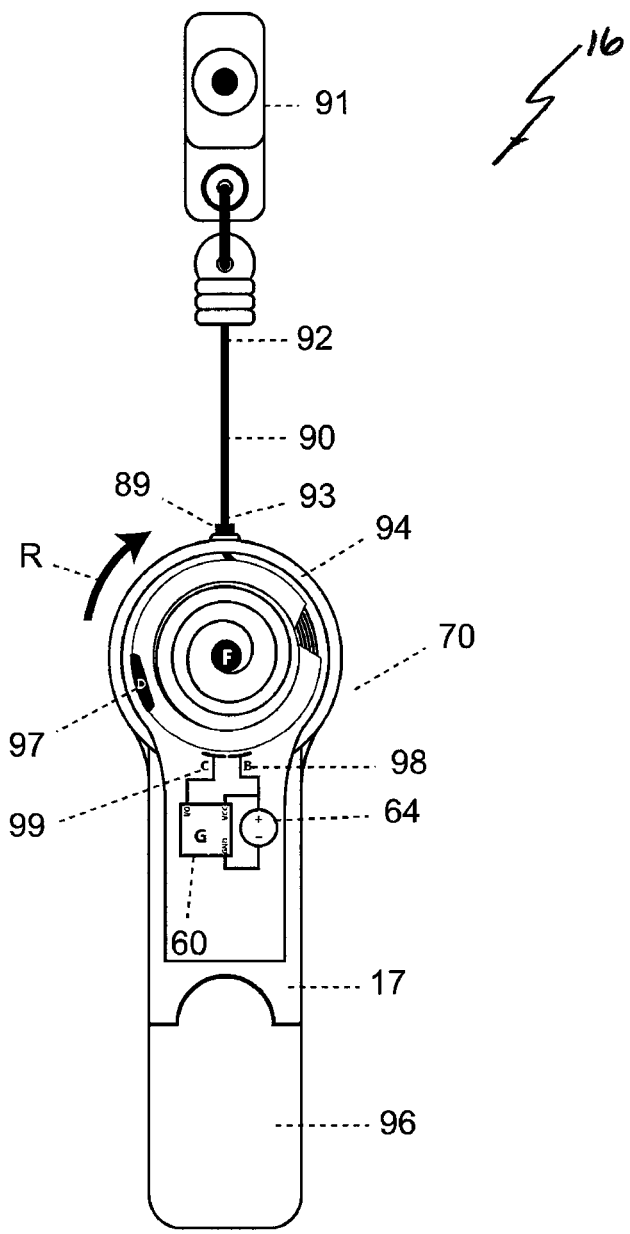
FIG. 6 is an elevational view of the reader assembly of FIG. 4, shown with a portion of the housing removed to expose certain internal components.

Referring to FIGS. 4-6, in a first construction, the reader assembly 16 may be connected to a retractable lead or cord 90 that may extend through an opening 89, such as a water-tight opening, in the housing 17. A connection member 91, such as a clip, clasp, button, snap or the like, may be connected proximate a first end 92 of the cord 90. As shown in FIG. 6, the second end 93 of the cord 90 may be connected to a retraction mechanism 94, such as a spring coil or spring-loaded spool, positioned within the housing 17.

As shown in FIGS. 4 and 6, the cord 90 may be withdrawn a pre-determined maximum distance from the housing 17 when a pulling force (arrow P in FIG. 4) overcomes the biasing force (arrow R in FIG. 6) of the retraction mechanism 94. Then, when the pulling force ceases, the biasing force of the retraction mechanism 94 may urge the cord 90 back into the housing 17, as shown in FIG. 5.

Thus, the second party 18 (FIG. 1) may connect the connection member 91 of the reader assembly 16 to his or her body (e.g., to a belt or a lapel), and may extend the housing 17 of the reader assembly 16 away from his or her body to present the reader assembly 16 in a position convenient for the first party 14 (FIG. 1) to approximate the identification assembly 12 toward the reader assembly 16 without being intrusive of the second party's personal space.

Optionally, a terminal cap 96 may be connectable to the reader assembly 16 to protect the connection interface 78, which may be a USB terminal. For example, the terminal cap 96 may include a recess that receives and covers the USB terminal, and an engagement member that engages the housing 17 to secure the terminal cap 96 relative to the housing 17.

In one implementation of the first construction of the reader assembly 16, the switch 70 (FIG. 3) may be actuated upon pulling the cord 90 a pre-set distance relative to the housing 17. For example, referring to FIG. 6, the switch 70 may include a conductive plate 97, a supply lead 98 and a draw lead 99. The conductive plate 97 may be connected to the outermost circumference of the retraction mechanism 94. Therefore, as the cord 90 is withdrawn from the housing 17, the retraction mechanism 94 may rotate within the housing 17, thereby approximating the conductive plate 97 with the leads 98, 99. Upon making contact with both leads 98, 99, the conductive plate 97 may close the circuit between the leads 98, 99 and the switch 70 may be actuated. Even after the conductive plate 97 is electrically decoupled from the leads 98, 99, the reader assembly 16 may remain in a powered-on configuration for a pre-determined amount of time, as described above.

Figure 7:
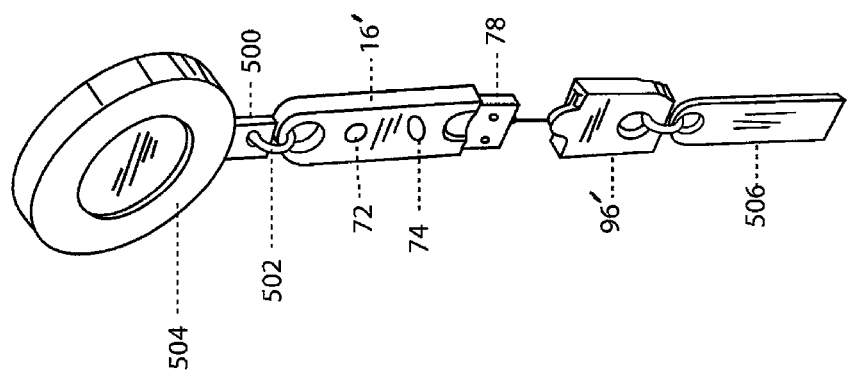
FIG. 7 is an isometric view of another aspect of the disclosed reader assembly.

Referring to FIG. 7, in a second construction, the reader assembly 16' may be connected to a retractable cord 500 by way of a ring 502. The retractable cord 500 may be biased into a cord housing 504, but may be withdrawn a pre-determined maximum distance from the cord housing 504 by pulling on the reader assembly 16'. Therefore, the second party 18 (FIG. 1) may connect the cord housing 504 to his or her body, and may extend the reader assembly 16' away from his or her body to present the reader assembly 16' to the first party 14 (FIG. 1).

In one optional expression, the cord 500 may be electrically conductive and, therefore, may electrically couple various components of the reader assembly 16', such as the processor 60 (FIG. 3) or the RFID receiver 66 (FIG. 3), to an external component of the reader assembly 16', such as an external antenna or an external energy storage device. The cord 500 may be rendered electrically conductive by incorporating a wire into the cord 500 or by applying an electrically conductive coating to the cord 500.

As one example, the energy storage device 64 (FIG. 3) may be housed in the cord housing 504 and may be electrically coupled to the other components of the reader assembly 16' by way of the electrically conductive, retractable cord 500. As another example, the antenna 68 (FIG. 3), which may be quite large, may be housed in the cord housing 504 and may be electrically coupled to the other components of the reader assembly 16' by way of the electrically conductive, retractable cord 500.

Figure 8:
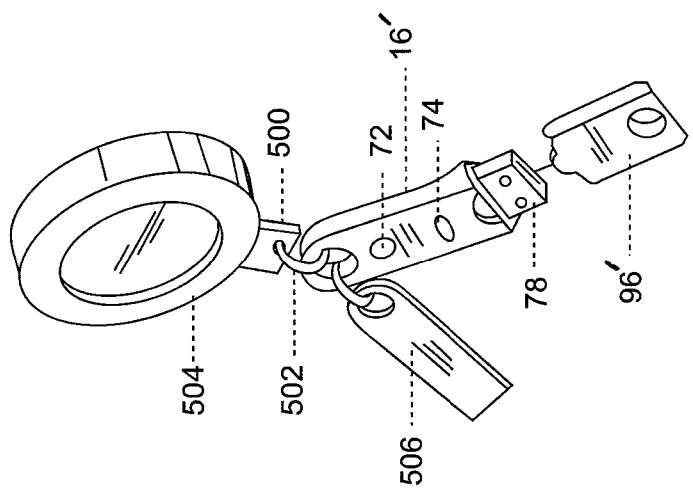
FIG. 8 is an isometric view of yet another aspect of the disclosed reader assembly.

In another optional expression, an employee badge 506 may be connected to the terminal cap 96', as shown in FIG. 7, or directly to the reader assembly 16', as shown in FIG. 8. While not shown, the employee badge 506 may also be connected to the cord housing 504. Those skilled in the art will appreciate that the cord housing 504 and employee badge 506 may be round, square, oval or may have many different shapes other than the shapes illustrated in the drawings.

Figure 9:
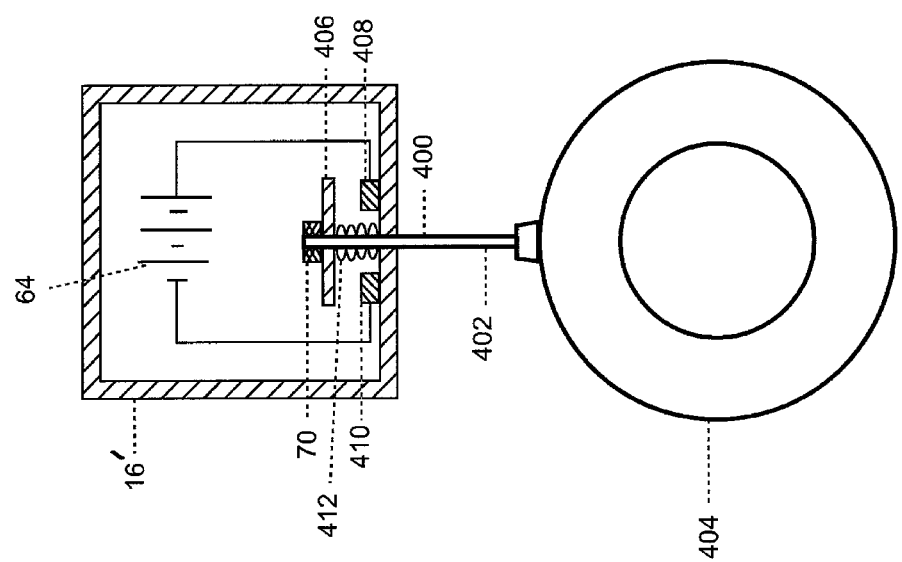
FIG. 9 is a partly diagrammatic and partly schematic view of an alternative embodiment of the reader assembly of the recognition and reward system of FIG. 1.

In one implementation of the second construction, the reader assembly 16' may be connected to the distal end 400 of a cord 402 that is retractable into a cord housing 404, as shown in FIG. 9. The cord housing 404 may be hand-held or may be connected to the second party 18 (FIG. 1), such as by clipping the cord housing 404 to a garment. Pulling on the reader assembly 16' may withdraw the cord 402 from the cord housing 404 and may automatically actuate the switch 70' that powers-on the reader assembly 16'. The switch 70' may include a conductive plate 406 biased away from a pair of contacts 408, 410 by a biasing element 412 (e.g., a spring). The plate 406 may be connected to the distal end 400 of the cord 402. Therefore, when the reader assembly 16' is pulled away from the cord housing 404, the retracting force acting on the cord 402 overcomes the biasing force of the biasing element 412, thereby pulling the conductive plate 406 into engagement with the contacts 408, 410 and closing the circuit. With the circuit closed, the reader assembly 16' is activated and ready to read identification codes 20 from an identification assembly 12.

Other techniques for automatically actuating the switch 70 (FIG. 3) of the reader assembly 16, including techniques for automatically actuating the switch 70 upon pulling the reader assembly 16 away from the cord housing 92 (FIG. 4), 404 (FIG. 6), are also contemplated.

In another realization of the first expression of the first embodiment of the disclosed recognition and reward system 10, the reader assembly 16 may be associated with an electronic device, such as a mobile telephone, a smartphone (e.g., a BlackBerry or an iPhone) or a personal digital assistant. An application (i.e., an "app") downloaded to the electronic device may enable the electronic device to function as the reader assembly 16. Additionally, use of an electronic device may facilitate communication of the collected data to a data collector by way of a telephone network.

Other realizations of suitable RFID-capable reader assemblies 16 will become apparent to those skilled in the art upon reading the present disclosure.

Referring back to FIG. 2, in a second expression of the first embodiment, the identification codes 32, 34, 36, 38 on the customer loyalty card identification assembly 12 may be magnetic stripes. Therefore, the reader assembly 16 shown in FIG. 1 may include a magnetic reading head capable of reading the magnetic stripes 32, 34, 36, 38 from the customer loyalty card identification assembly 12. For example, one or more of the identification codes 32, 34, 36, 38 on the customer loyalty card identification assembly 12 may be "read" by swiping the identification assembly 12 through a designated slot in the reader assembly 16 (FIG. 1), as is well known in the art.

In a third expression of the first embodiment, the identification codes 32, 34, 36, 38 on the customer loyalty card identification assembly 12 may be bar codes. Therefore, the reader assembly 16 shown in FIG. 1 may include a bar code scanner capable of reading the bar codes 32, 34, 36, 38 from the customer loyalty card identification assembly 12, as is well known in the art.

In a fourth expression of the first embodiment, the identification codes 32, 34, 36, 38 on the customer loyalty card identification assembly 12 may include multiple modes of data communication. For example, identification codes 32, 34 may be RFID tags and identification codes 36, 38 may be magnetic stripes.

Figure 10:
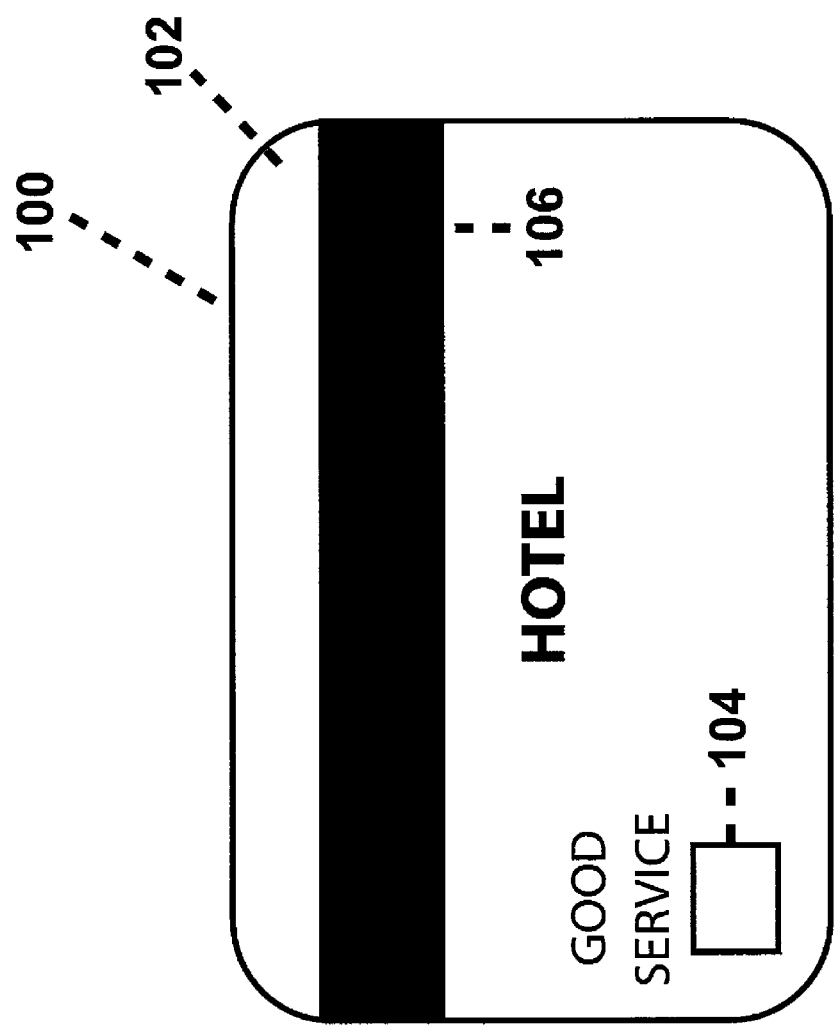
FIG. 10 is a top plan view of a first alternative embodiment of the identification assembly of the recognition and reward system of FIG. 1.

In a second embodiment of the recognition and reward system 10 shown in FIG. 1, the identification assembly 12 may function as a key, such as a key issued by a hotel, resort, cruise line or rental agency for opening a door or actuating an ignition system. As shown in FIG. 10, a key-based identification assembly, generally designated 100, may include a key substrate 102 and an identification code 104, such as an RFID tag, supported by the key substrate 102. As one specific example, the key substrate 102 may be a magnetic key card and may include a magnetic stripe 106 having data for unlocking a designated door.

Figure 11:
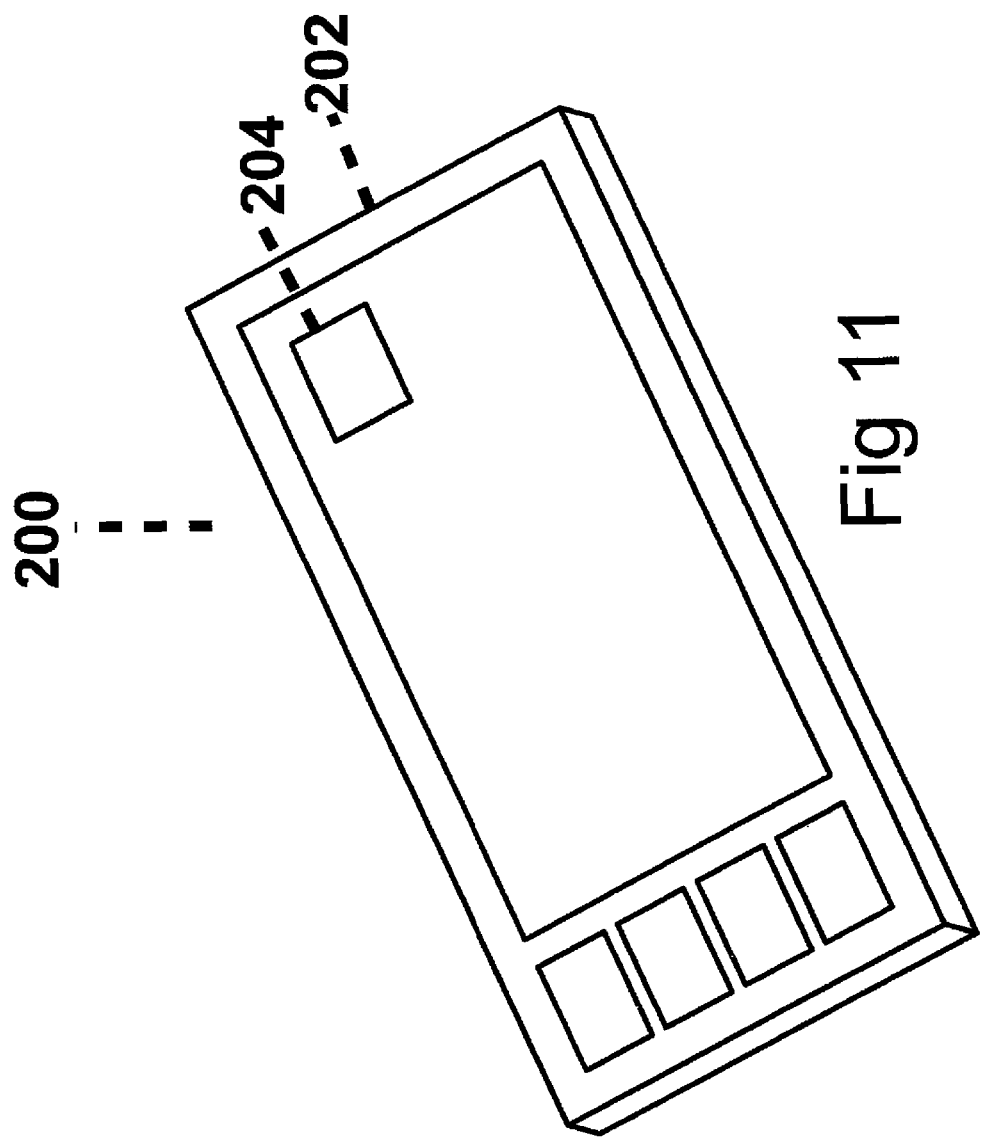
FIG. 11 is an isometric view of a second alternative embodiment of the identification assembly of the recognition and reward system of FIG. 1.

In a third embodiment of the recognition and reward system 10 shown in FIG. 1, the identification assembly 12 may function as an electronic device, such as a mobile telephone, a smartphone (e.g., an iPhone) or a personal digital assistant (e.g., an iPad). Specifically, as shown in FIG. 11, an electronic device-based identification assembly, generally designated 200, may include an electronic device 202 that functions as the substrate that supports an identification code 204, such as an RFID tag. The identification code 204 may be mounted on various components of the electronic device 202 so as not to interfere with the functionality of the electronic device 202. For example, the identification code 204 may be mounted on the casing of the electronic device, either internally or externally.

In one optional expression of the third embodiment, an application (i.e., an "app") may be downloaded to the electronic device 202 (e.g., smartphone). The app may provide information concerning steps that might be taken to identify employee behavior which is considered important to recognize and reward. Furthermore, the app may be configured to generate and/or display the identification code 204, thereby eliminating the need for physically modifying the electronic device 202 to include an identification code 204. As one example, a smartphone may include an app configured to generate and display a bar code on the screen of the smartphone, and the bar code may be read by a bar code-based reader assembly 16. As another example, a smartphone may include an app configured to generate a signal (e.g., by way of the smartphone's radio), which may be detectable by an RFID-based reader assembly 16.

Thus, using an electronic device, such as a smartphone, as the identification assembly 12 may be advantageous in that it provides the functionality of a card-based identification assembly (i.e., data communication), but avoids the costs associated with distributing cards and provides the opportunity for enhanced interaction by way of an app.

Figure 12:
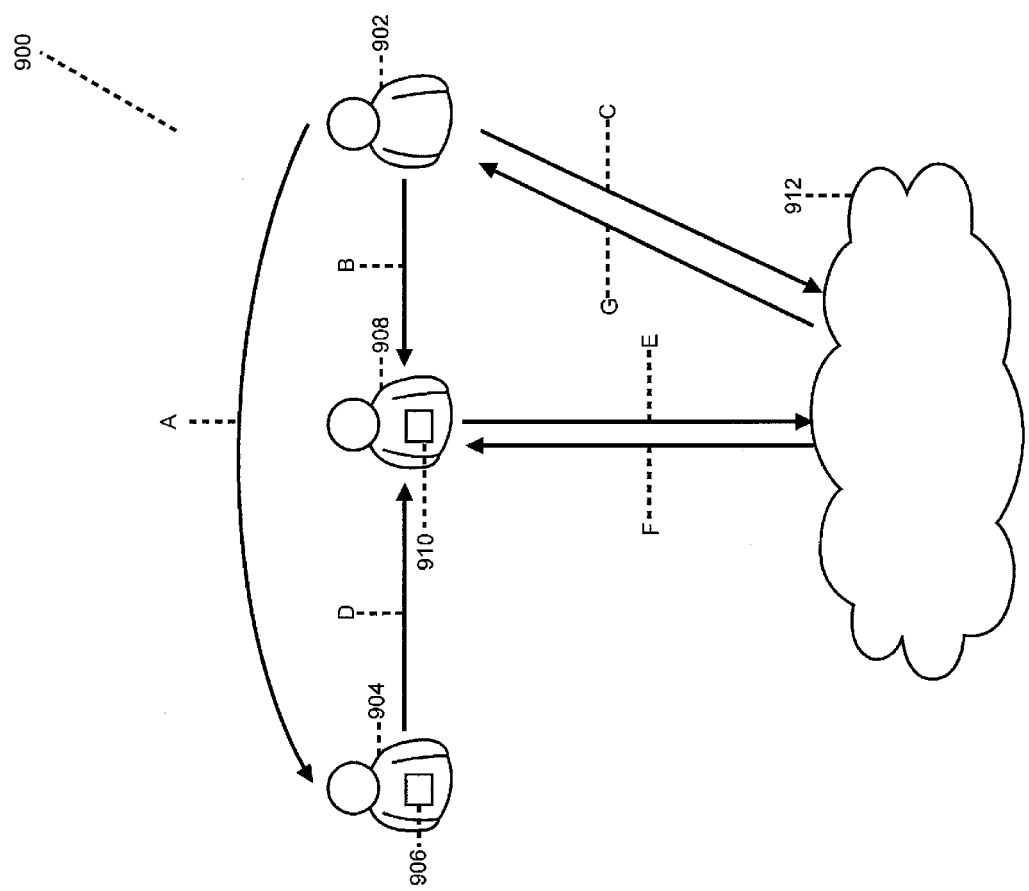
FIG. 12 is a schematic illustration of another aspect of the disclosed recognition and reward system.

Another aspect of the disclosed recognition and reward system is shown in FIG. 12 and generally designated 900. An employer 902 may provide to a customer and/or supervisor 904 an identification assembly 906, as shown by arrow A. Furthermore, the employer 902 may provide to an employee 908 a reader assembly 910, as shown by arrow B. Optionally, the employer 902 may contract with a third party that provides a rewards program platform 912, such as a software-based (e.g., web software-based) rewards program platform. The employer 902 may identify (e.g., by name or number) to the rewards program platform 912 the customers 904 and employees 908 participating in the recognition and reward system 900, as shown by arrow C.

The customer may be instructed that employees may be rewarded if they receive a pre-determined amount of recognition from customers. The customer may also be instructed that employees may be recognized by transferring data from the customer's identification assembly 906 to the employee's reader assembly 910, in the manner disclosed herein.

As shown by arrow D, the customer 904 may recognize the employee 908 by transferring data from the customer's identification assembly 906 to the employee's reader assembly 910. For example, data transfer may be achieved in an RFID-based system by tapping the customer's identification assembly 906 against the employee's reader assembly 910. Various reasons for recognizing an employee 908 are described in greater detail above (e.g., the rendering of exceptional service). Examples of suitable reasons may be communicated to the customer 904 by the employer 902 and/or may be indicated on the identification assembly 906. Nonetheless, the ultimate decision whether or not to recognize an employee 908 will rest with the customer 904.

The recognition data collected by the employee 908 may be communicated to the rewards program platform 912, as shown by arrow E. The recognition data collected by the employee 908 may be communicated to the rewards program platform 912 by way of the connection interface 78 (FIG. 3) of the employee's reader assembly 910. For example, as described herein, the employee 908 may download the recognition data to the rewards program platform 912 by connecting the reader assembly 910 to a computer by way of the reader assembly's USB terminal or by tethering the reader assembly 910 to a smartphone.

The communication of recognition data to the rewards program platform 912 may occur randomly (e.g., as determined by the employee 908) or at pre-defined intervals (e.g., at the conclusion of each shift worked by the employee 908). For example, the employee 908 may interface the reader assembly 910 with a computer (not shown), such as by plugging the reader assembly 910 into a USB port of the computer. The computer may be configured with software such that the computer recognizes the reader assembly 910, retrieves the recognition data from the reader assembly 910, optionally deletes the retrieved recognition data from the reader assembly 910, and communicates the retrieved recognition data to the rewards program platform 912.

The rewards program platform 912 may compile the recognition data, and may issue the employee 908 reward points based on, for example, the type and amount of recognition data collected by the employee 908. The employee's reward points may be accumulated in an account maintained by the rewards program platform 912 until the reward points are redeemed by the employee 908 for various rewards (e.g., lifestyle gifts or products marked with the employer's logo) made available to the employee 908 by the rewards program platform 912, as shown by arrow F.

Furthermore, as shown by arrow G, the rewards program platform 912 may provide the employer 902 with a list of customers 904 that have recognized employees 908 and the reasons for the recognition (if applicable), as well as a list of employees 908 that have received recognition from customers 904 and the reasons for the recognition (if applicable).

In yet another aspect of the disclosed recognition and reward system, certain (or all) functions of the rewards program platform may be assumed by the employer. For example, the recognition data collected by the employee 908 may be communicated directly to the employer 902.

Accordingly, the disclosed recognition and reward system and method may provide a quick and efficient way to encourage employees to be careful and helpful each time they interface with a customer because they may be recognized and rewarded by the customer for their performance.

Although various aspects of the disclosed recognition and reward system and method have been shown and described, modifications may occur to those skilled in the art upon reading the specification. For example, repeated reference is made herein to a customer-employee relationship, other relationships, such as relationships with contractors, agents and suppliers, as well as student-teacher relationships, may also benefit from the disclosed system and method. The present application includes such modifications and is limited only by the scope of the claims.

What is claimed is:
1. A recognition and reward system comprising:
an identification assembly carried by a first party, said identification assembly comprising an identification code supported by a substrate, said identification code comprising data;
a reader assembly carried by a second party, said reader assembly being configured to collect said data from said identification code when said identification assembly is presented to said reader assembly; and
a rewards program platform selectively interfaceable with said reader assembly to receive said data collected by said reader assembly, wherein said rewards program platform awards redeemable points to one of said first and second parties based on said collected data wherein said data is indicative of a reason for recognition of said one of said first and second parties, said reason for recognition being based upon a plurality of recognizable actions performed by said one of said first and second parties.

2. The recognition and reward system of claim 1 wherein said data is indicative of said first party.

3. The recognition and reward system of claim 1 wherein said plurality of recognizable actions are selected from a group consisting of services being provided, problems being solved, and safety being maintained.

4. The recognition and reward system of claim 3 wherein said reason for recognition is a positive experience in response to at least one action of said plurality of recognizable actions.

5. The recognition and reward system of claim 1 wherein said first party is a customer and said second party is an employee.

6. The recognition and reward system of claim 1 wherein said first party is an employee and said second party is a customer.

7. The recognition and reward system of claim 1 wherein said identification assembly comprises a plurality of said identification code.

8. The recognition and reward system of claim 7 wherein each identification code of said plurality comprises unique data indicative of a selected one action of said plurality of recognizable actions.

9. The recognition and reward system of claim 1 wherein said identification code comprises a radio frequency identification ("RFID") tag.

10. The recognition and reward system of claim 9 wherein said RFID tag is a passive RFID tag.

11. The recognition and reward system of claim 9 wherein said RFID tag has a range of at most 12 inches.

12. The recognition and reward system of claim 9 wherein said RFID tag has a range of at most 2 inches.

13. The recognition and reward system of claim 9 wherein said RFID tag has a range of at least 1 inch.

14. The recognition and reward system of claim 9 wherein said reader assembly comprises an RFID receiver and an antenna.

15. The recognition and reward system of claim 1 wherein said reader assembly is a smartphone.

16. The recognition and reward system of claim 1 wherein said identification code comprises a magnetic stripe.

17. The recognition and reward system of claim 16 wherein said reader assembly comprises a magnetic reading head.

18. The recognition and reward system of claim 1 wherein said identification code comprises a bar code.

19. The recognition and reward system of claim 18 wherein said reader assembly comprises a bar code scanner.

20. The recognition and reward system of claim 1 wherein said substrate is a label.

21. The recognition and reward system of claim 1 wherein said substrate is a customer loyalty card.

22. The recognition and reward system of claim 1 wherein said substrate is a key.

23. The recognition and reward system of claim 22 wherein said key is a magnetic key.

24. The recognition and reward system of claim 1 wherein said substrate is an electronic device.

25. The recognition and reward system of claim 1 wherein said substrate is a smartphone.

26. The recognition and reward system of claim 1 wherein said substrate is marked with indicia identifying said identification code.

27. The recognition and reward system of claim 1 wherein said reader assembly comprises a speaker configured to generate a human-recognizable tone when said reader assembly successfully collects said data from said identification code.

28. The recognition and reward system of claim 1 wherein said reader assembly comprises a light source configured to be illuminated when said reader assembly successfully collects said data from said identification code.

29. The recognition and reward system of claim 1 wherein said reader assembly comprises a storage medium, and wherein said collected data is stored in said storage medium.

30. The recognition and reward system of claim 1 wherein said reader assembly comprises a USB terminal, and wherein said rewards program platform is selectively interfaceable with said reader assembly by way of said USB terminal.

31. The recognition and reward system of claim 30 further comprising a cap removably received over said USB terminal.

32. The recognition and reward system of claim 1 wherein said reader assembly is connected to a retractable cord, said retractable cord being biased into a cord housing.

33. The recognition and reward system of claim 32 wherein said reader assembly is configured to automatically actuate when said retractable cord is withdrawn from said cord housing.

34. The recognition and reward system of claim 32 wherein said retractable cord is electrically conductive.

35. The recognition and reward system of claim 34 wherein said reader assembly comprises an RFID receiver and an antenna, and wherein said antenna is housed in said cord housing and electrically coupled to said RFID received by way of said retractable cord.

36. The recognition and reward system of claim 1 further comprising a badge connected to said reader assembly.

37. The recognition and reward system of claim 1 wherein said reader assembly associated said collected data with a specific date and time.

38. A recognition and reward system comprising:
an identification assembly carried by a first party, said identification assembly comprising a substrate and a plurality of identification codes supported by said substrate, each identification code of said plurality comprising data indicative of said first party and a unique reason for recognition, said reason for recognition being based upon a unique action of a plurality of recognizable actions; and
a reader assembly carried by a second party, said reader assembly being configured to collect said data from at least one identification code of said plurality of identification codes when said identification code is presented to said reader assembly.

39. The recognition and reward system of claim 38 wherein said first party is a customer and said second party is an employee.

40. The recognition and reward system of claim 38 wherein said first party is an employee and said second party is a customer.

41. The recognition and reward system of claim 38 wherein said identification code comprises an RFID tag and said reader assembly comprises an RFID receiver.

42. The recognition and reward system of claim 38 wherein said substrate is a customer loyalty card.

43. The recognition and reward system of claim 38 wherein said substrate is a magnetic key card.

44. The recognition and reward system of claim 38 wherein said substrate is marked with indicia identifying each identification code of said plurality with said corresponding unique reason for recognition.

45. A method for recognizing a first party by a second party and rewarding said first party for such recognition, said method comprising the steps of:
- providing said second party with an identification assembly comprising an identification code supported by a substrate, said identification code comprising data indicative of said second party and a reason for recognition of said first party, said reason for recognition being based upon a plurality of recognizable actions performed by said first party;
- providing said first party with a reader assembly;
- performing, by said first party, an action;
- recognizing, by said second party, said action performed by said first party as being at least one of said plurality of recognizable actions;
- presenting said identification code to said reader assembly such that said reader assembly collects said data from said identification code;
- transferring said data collected by said reader assembly to a rewards program platform; and
- awarding said first party points based on said data transferred to said rewards program platform.

46. The method of claim 45 further comprising the steps of:
- accumulating said points on said rewards program platform; and
- redeeming, by said first party, at least a portion of said points for a reward.

47. The method of claim 45 wherein said awarding step comprises adding said point to previously awarded points, said point and said previously awarded points being accumulated in an account maintained by said rewards program platform for said first party.

48. The method of claim 45 wherein said identification code comprises an RFID tag and said reader assembly comprises an antenna, and wherein said presenting step comprises approximating said RFID tag with said antenna.

49. The method of claim 45 wherein said transferring step comprises interfacing said reader assembly with a computer and communicating said collected data over a network.

50. The method of claim 45 wherein said first party is an employee of a company and said second party is a customer of said company; and
- wherein presentation of said identification code to said reader is initiated by said second party following recognition of said action performed by said first party.

51. A method for recognizing a first party by a second party and rewarding said first party for such recognition, said method comprising the steps of:
- providing said first party with an identification assembly comprising an identification code supported by a substrate, said identification code comprising data indicative of said first party and a reason for recognition of said first party, said reason for recognition being based upon a plurality of recognizable actions performed by said first party;
- providing said second party with a reader assembly;
- performing, by said first party, an action;
- recognizing, by said second party, said action performed by said first party as being at least one of said plurality of recognizable actions;
- presenting said identification code to said reader assembly such that said reader assembly collects said data from said identification code;
- transferring said data collected by said reader assembly to a rewards program platform; and
- awarding said first party points based on said data transferred to said rewards program platform.

52. The method of claim 51 further comprising the steps of:
- accumulating said points on said rewards program platform; and
- redeeming, by said first party, at least a portion of said points for a reward.

53. The method of claim 51 wherein said awarding step comprises adding said point to previously awarded points, said point and said previously awarded points being accumulated in an account maintained by said rewards program platform for said first party.

54. The method of claim 51 wherein said identification code comprises an RFID tag and said reader assembly comprises an antenna, and wherein said presenting step comprises approximating said RFID tag with said antenna.

55. The method of claim 51 wherein said transferring step comprises interfacing said reader assembly with a computer and communicating said collected data over a network.

56. The method of claim 51 wherein said first party is an employee of a company and said second party is a customer of said company; and
- wherein presentation of said identification code to said reader is initiated by said second party following recognition of said action by said first party.

* * * * *